(12) United States Patent
Subia

(10) Patent No.: US 11,497,234 B1
(45) Date of Patent: Nov. 15, 2022

(54) DEVICE FOR FLAVORING BEVERAGES

(71) Applicant: Steve Subia, Midland, TX (US)

(72) Inventor: Steve Subia, Midland, TX (US)

(*) Notice: Subject to any disclaimer, the term of this patent is extended or adjusted under 35 U.S.C. 154(b) by 449 days.

(21) Appl. No.: 16/710,149

(22) Filed: Dec. 11, 2019

(51) Int. Cl.
| A23L 27/00 | (2016.01) |
| A23L 33/17 | (2016.01) |
| A23L 27/28 | (2016.01) |
| G06K 19/06 | (2006.01) |
| G06K 7/14 | (2006.01) |
| G06K 7/10 | (2006.01) |
| A23L 2/56 | (2006.01) |

(52) U.S. Cl.
CPC ............ *A23L 27/70* (2016.08); *A23L 2/56* (2013.01); *A23L 27/28* (2016.08); *A23L 33/17* (2016.08); *G06K 7/10722* (2013.01); *G06K 7/1417* (2013.01); *G06K 19/06037* (2013.01); *A23V 2002/00* (2013.01)

(58) Field of Classification Search
CPC . A23L 27/70; A23L 2/56; A23L 27/28; A23L 33/17; G06K 7/10722; G06K 7/1417; G06K 19/06037; A23V 2002/00
See application file for complete search history.

(56) References Cited

U.S. PATENT DOCUMENTS 3,869,555 A * 3/1975 Heonis .................. A23P 10/10
426/597
9,334,150 B1 * 5/2016 Ost ...................... B67D 1/0888

* cited by examiner

*Primary Examiner* — Matthew Mikels
(74) *Attorney, Agent, or Firm* — Sanchelima & Associates, P.A.; Christian Sanchelima; Jesus Sanchelima

(57) ABSTRACT

A device for flavoring beverages is disclosed herein. The device includes a spoon having a handle end and a shovel end. Located on the shovel end is a dissolvable composition including a flavor. Printed on the shovel end is indicia, preferably inspirational indicia. In use, a user may place the shovel end of the spoon into a beverage and stir to dissolve the flavor into the beverage. The shovel end may additionally come in variety of shapes and sizes and not limited to a spoon shape. Once the composition is dissolved, the indicia is revealed. Furthermore, the device for flavoring beverages includes inspirational indicia thereon to motivate users of all walks of life. Additionally, the device includes a QR code that may be scanned by a user's mobile device in order to share and create more motivational indicia.

10 Claims, 4 Drawing Sheets

DEVICE FOR FLAVORING BEVERAGES

BACKGROUND OF THE INVENTION

1. Field of the Invention

The present invention relates to kitchen utensils and, more particularly, to a device for flavoring beverages that resembles the shape of a spoon and includes inspirational indicia thereon.

2. Description of the Related Art

Several designs for a device for flavoring beverages have been designed in the past. None of them, however, include a device for flavoring beverages. The device includes a spoon having a handle end and a shovel end. Located on the shovel end is a dissolvable composition including a flavor. Printed on the shovel end is indicia, preferably inspirational indicia. In use, a user may place the shovel end of the spoon into a beverage and stir to dissolve the flavor into the beverage. Once the composition is dissolved, the indicia is revealed. It should be understood that the shovel end may come in a variety of shapes including shapes that may be appealing to children as well as other shapes. It is known that individuals often have the desire to flavor their beverages using known flavor enhancers such as chocolate, sugar, and the like. It is also known that these flavor enhancers often come in a powder form. This powder form is known to cause hard to clean messes if the powder is spilled. Therefore, there is a need for a unique device used to flavor beverages that also includes inspirational indicia to encourage and motivate a user. Furthermore, the device can be used as a condiment such as creamer or sugar. It can also be used as an energy booster or vitamin supplement mixer. For elderly individuals, the device provides an easy way to liquidize medication.

Applicant believes that a related reference corresponds to patent (published application) No. WO2008/103157 issued for an instant beverage on stir stick. The cited disclosure comprises a stirring stick which has a logo on a handle portion and a solidified or compacted dried instant beverage mix attached to an opposite end of the stick. Applicant believes another reference relates to U.S. patent 2013/0266685 for a drink sample apparatus and method of use. The cited disclosure comprises an elongated stick, an indicium of the drink mixture marked on said stirring stick, a small mixture of a mixed drink or oil extract of the same. However, the references differ from the present invention because they collectively fail to address the spoon with flavor composition and inspirational indicia. The present invention addresses these issues by including a device having a flavor composition and inspirational indicia. Additionally, the device includes a QR code that may be scanned by a user to reveal an inspirational message on a user's mobile device.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a device for flavoring beverages that is easy to clean up and additionally provides an effortless configuration to allow children to flavor their beverage without causing a mess.

It is another object of this invention to provide a device for flavoring beverages that is portable and allows a user to flavor a beverage wherever they go.

It is still another object of the present invention to provide a device for flavoring beverages that includes motivational indicia thereon to motivate users of all walks of life. Additionally, the device includes a QR code that may be scanned by a user's mobile device in order to share and create more motivational indicia.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
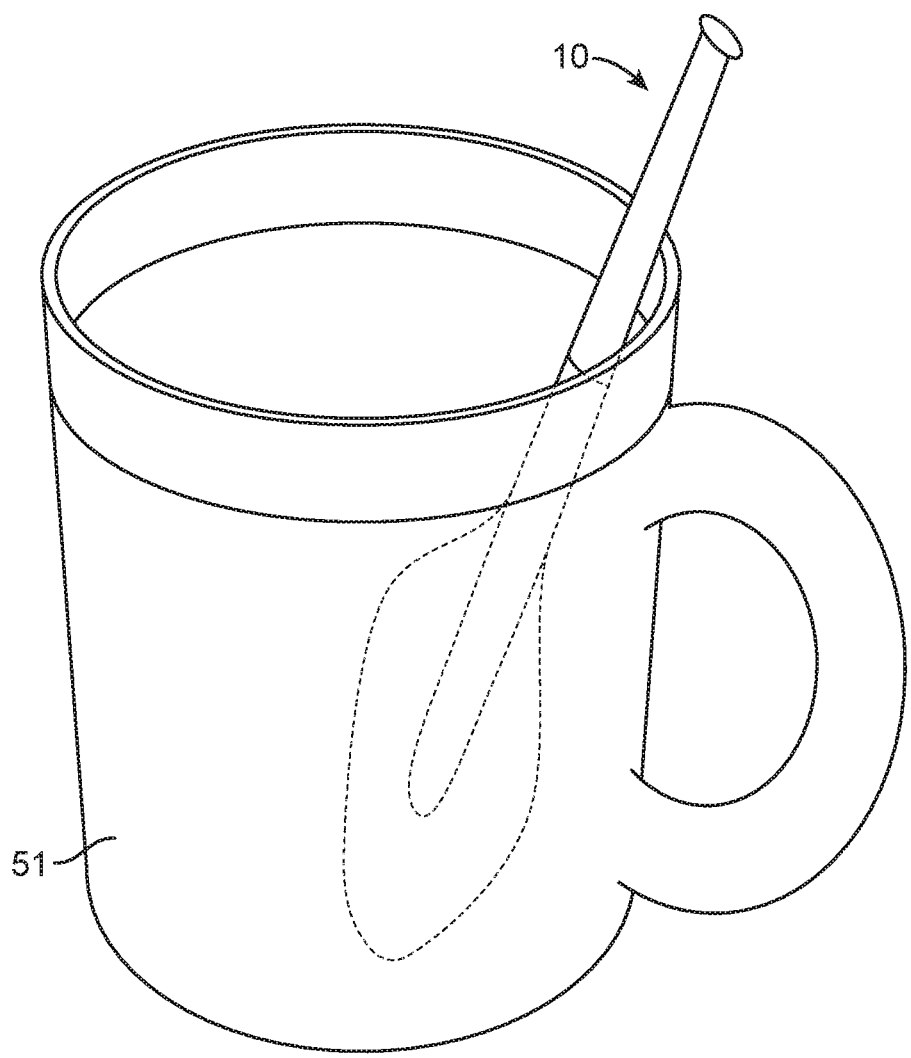
FIG. 1 represents a device for flavoring beverages 10 including a handle assembly 20 and a shovel assembly 40 in its operating environment in accordance to an embodiment of the present invention.
Figure 2:
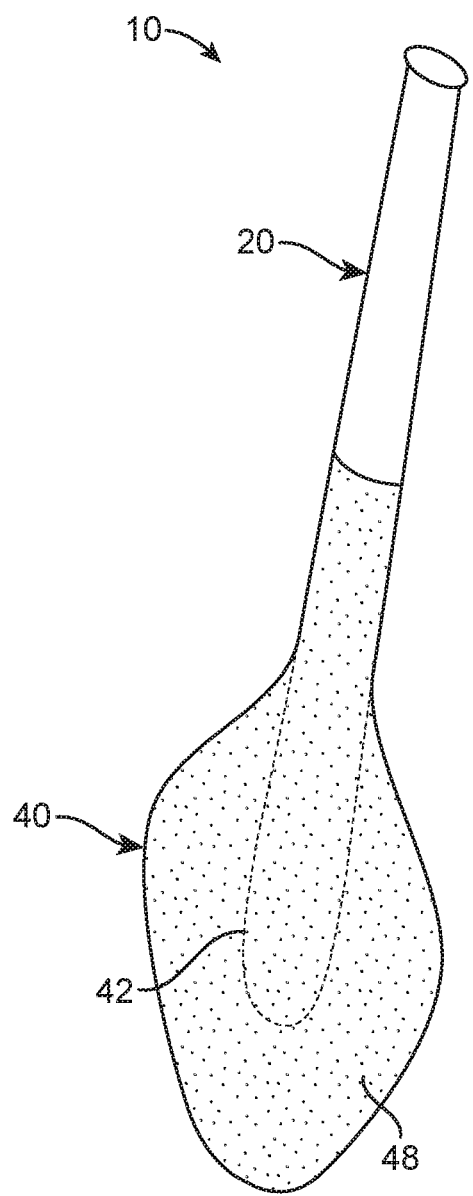
FIG. 2 shows an isometric view of a device for flavoring beverages 10 in accordance with an embodiment of the present invention.
Figure 3:
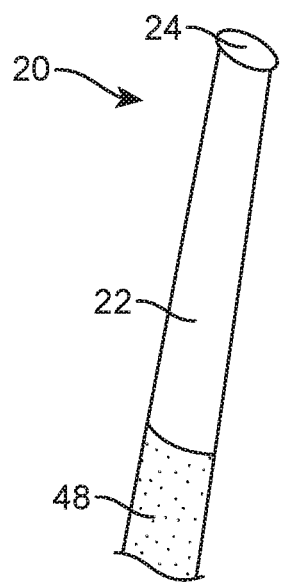
FIG. 3 illustrates an enlarged view of handle assembly 20 in accordance to an embodiment of the present invention.
Figure 4:
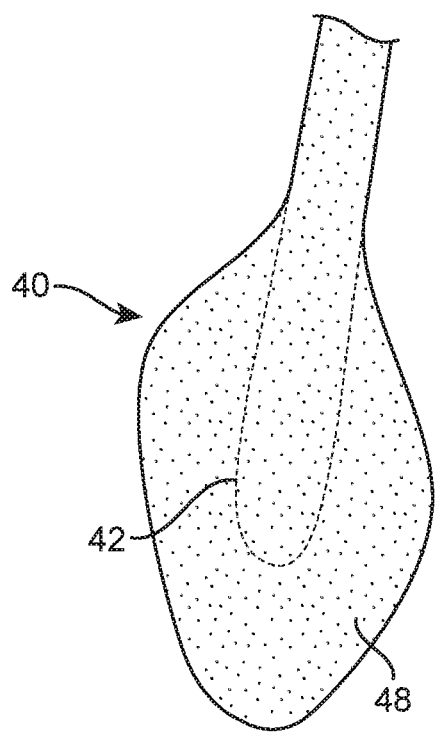
FIG. 4 is a representation of an enlarged view of shovel assembly 40 in accordance to an embodiment of the present invention.
Figure 5:
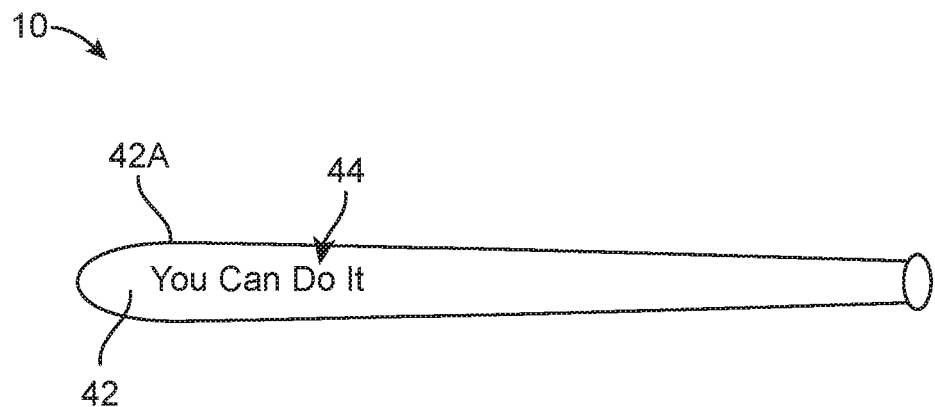
FIG. 5 shows a front side 42A of shovel assembly 40 absent of dissolvable composition 48 showing indicia 44 thereon in accordance to an embodiment of the present invention.
Figure 6:
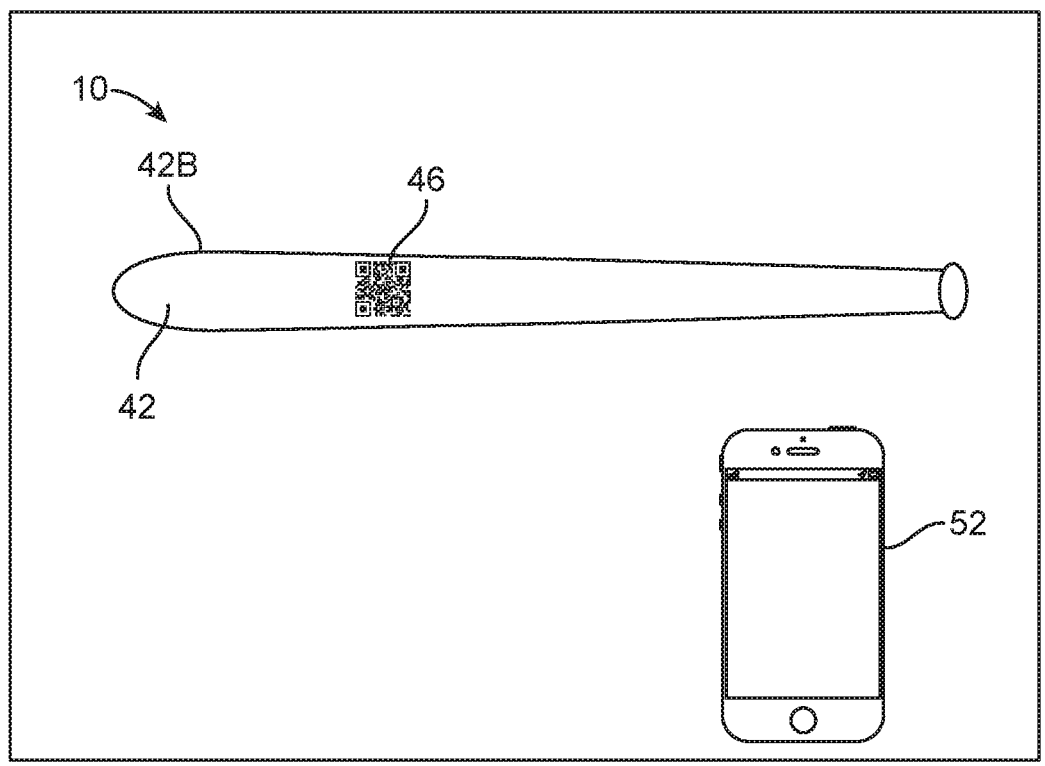
FIG. 6 illustrates a back side 42B of shovel assembly 40 absent of dissolvable composition 48 showing QR code 44 thereon paired with a mobile device 52 in accordance to an embodiment of the present invention.

Referring now to the drawings, where the present invention is generally referred to with numeral 10, it can be observed a device for flavoring beverages 10 that basically includes a handle assembly 20, a shovel assembly 40, a beverage container 51, and a mobile device 52.

Handle assembly 20 includes an elongated portion 22 and a handle protrusion 24 integrally mounted to a top end of elongated portion 22. Elongated portion 22 and handle protrusion 24 may be made of the same material. This may include any suitable material for being inserted in beverages such as but not limited to plastic, metal, and the like. In an embodiment of the present invention, elongated portion 22 comprises a cylindrical shape and extends a length from handle protrusion 24 to shovel assembly 40. Additionally, handle protrusion 24 may comprises a circular shape. The diameter of handle protrusion 24 may be larger than the diameter of elongated portion 22 in an embodiment of the present invention. Elongated portion 22 comprises a suitable length to allow a user enough room to comfortable grip elongated portion 22 to enable a stirring configuration. Handle protrusion 24 further aids a user in gripping handle assembly 20 by providing an ergonomic end further enabling the stirring configuration. Shovel assembly 40 is then mounted to a bottom end of elongated rod 22.

Shovel assembly 40 includes a shovel end 42 having a front side 42A and a back side 42B. In an embodiment of the present invention, shovel end 42 may comprise of the same material as handle assembly 20. This being a suitable material to be inserted into a beverage such as plastic, metal and the like. Additionally, shovel end 42 may be provided in an elliptical shape having a width that extends further than that of elongated rod 22. It should be understood that the shovel end 42 may come in variety of shapes and sizes and is not limited to being a spoon. This may include shapes such that are appealing and fun to children. Additionally, seasonal art figures may be used as the shovel end 42. Any shapes appealing for different age groups may be used. Frontside 42A of shovel end 42 further includes indicia 44 printed thereon. In an embodiment of the present invention, indicia 44 may comprise of an inspirational message that motivates the user when read. Indicia 44 may be printed there on using an ink that is suitable to be inserted into a beverage. Backside 42B of shovel end 42 further includes a QR code 46 printed thereon. QR code 46 may be made of the same suitable ink as the one used for indicia 44. In an embodiment of the present invention, QR code 46 may be scannable by an application programmed for a mobile device 52. When QR code 46 is scanned by mobile device 52, the application then provides a user with an additional inspirational message on their phone. Furthermore, a user may share their inspirational message to other users having a mobile device 52. Shovel assembly 20 includes a dissolvable composition 48 having a flavor. In an embodiment of the present invention, dissolvable composition 48 may be a moldable substance that is easily dissolved in a liquid. Dissolvable composition 48 may be mounted as an integral part of shovel end 42 and extend to elongated portion 22. Additionally, dissolvable composition 48 may be molded to resemble the shape of a spoon. The flavor of dissolvable composition 48 may be of any suitable flavor to enhance the taste of a beverage. This may include flavors such as but not limited to chocolate, strawberry, sugar, and the like. Furthermore, dissolvable composition 48 may also include a protein supplement to aid a user in ingesting extra protein. In an embodiment of the present invention, dissolvable composition 48 is provided as an integral part of said shovel assembly 40. In another embodiment of the present invention, dissolvable composition 48 may be removable from shovel assembly 40 to allow a user to reuse the present invention 10 and apply additional flavors to beverages.

In an embodiment of the present invention, device for flavoring beverages 10 is inserted into a beverage container 51 having a liquid therein. A user then inserts shovel end 42 having dissolvable composition 48 with flavor into the liquid contained within the beverage container 51. A user may then use elongated portion 22 to then preform a stirring motion to stir shovel end 42 within the liquid. Furthermore, a user continues to stir shovel end 42 until dissolvable composition 48 has been completely dissolved from shovel end 42. Dissolvable composition 48 now provides flavor to the liquid within beverage container 51. The present invention 10 provides an easy and efficient way to flavor a beverage. The present invention 10 can additionally be used as a condiment such as creamer or sugar. Furthermore, it can be used as an energy booster or as a vitamin supplement mixer. The present invention 10 further provides the elderly an easy way to take a liquidize medication.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a device for flavoring beverages, comprising:
   a. a handle assembly, including an elongated portion with a cylindrical body and a handle protrusion having a circular shape, wherein said handle protrusion is an integral part of said elongated portion, said handle protrusion is concentrically placed on a top distal end of said elongated portion; and
   b. a shovel assembly, including a shovel end having an elliptical body, wherein said shovel end includes a front side and a back side configured to be revealed, wherein said frontside includes indicia printed thereon, wherein said shovel assembly further includes a dissolvable composition having a flavor which extends an entire inner body thereof defining an elliptical shape, wherein said dissolvable composition envelops said shovel end and extends thereon said elongated portion covering said indicia; and
   c. a beverage container configured to receive said shovel with said dissolvable composition, said shovel end configured to be stirred by a user with said elongated portion, said elongated portion configured to dissolve said dissolvable composition into liquid container within said beverage container;
   d. a mobile device, configured to scan said indicia from said shovel end when said front side and said back side are revealed.

2. The system for a device for flavoring beverages of claim 1 wherein said elongated portion comprises a cylindrical shape while said shovel has an elliptical shape.

3. The system for a device for flavoring beverages of claim 2, wherein said handle protrusion is concentrically placed to a distal end of said elongated portion and comprises a circular shape having a diameter larger than said elongated portion.

4. The system for a device for flavoring beverages of claim 1, wherein said shovel end is an integral part of said elongated portion, said shovel configured to be dissolved allowing to reveal said indicia placed on said elongated portion.

5. The system for a device for flavoring beverages of claim 1, wherein said indicia is configured to be customized to show any messages on the elongated portion.

6. The system for a device for flavoring beverages of claim 1 wherein said back side of said shovel end includes a QR code scannable by said mobile device, said QR code configured to be revealed when said dissolvable composition is dissolved within said beverage container.

7. The system for a device for flavoring beverages of claim 1 wherein said dissolvable composition includes a protein supplement, a chocolate flavor or a variation thereof.

8. The system for a device for flavoring beverages of claim 1 wherein said dissolvable composition is provided as an integral part of said shovel end and said elongated portion and reveals said indicia when dissolved.

9. A system for a device for flavoring beverages, comprising:

a. a handle assembly, including an elongated portion and a handle protrusion, wherein said handle protrusion is an integral part of said elongated portion when said handle protrusion is concentrically placed on a distal end of said elongated portion, wherein said elongated portion comprises a cylindrical shape, wherein said handle protrusion comprises a circular shape, wherein the diameter of said handle protrusion is larger than the diameter of said elongated portion; and b. a shovel assembly, including a shovel end having an elliptical body, wherein said shovel end includes a front side and a back side configured to be revealed, wherein said frontside includes indicia printed thereon, wherein said indicia is an inspirational message or any message, wherein said back side includes a QR code printed thereon configured to be scanned when said dissolvable composition is dissolved, wherein said shovel assembly further includes a dissolvable composition having a flavor which extends an entire inner body thereof defining an elliptical shape, wherein said flavor of said dissolvable composition is a chocolate flavor having a protein supplement, wherein said dissolvable composition envelops said shovel end and extends thereon said elongated portion, wherein said dissolvable composition is an integral part of said shovel end and said elongated portion, said elongated portion covered by a predetermined half portion by said shovel;

c. a beverage container configured to receive said shovel with said dissolvable composition, said shovel end configured to be stirred by a user with said elongated portion, said elongated portion configured to dissolve said dissolvable composition into liquid container within said beverage container; and d. a mobile device configured to scan said QR code by a user to reveal an additional inspirational message to a user, wherein a user may then share said inspirational message to additional users.

10. A system for a device for flavoring beverages, consisting of:

a. a handle assembly, including an elongated portion and a handle protrusion, wherein said handle protrusion is an integral part of said elongated portion when said handle protrusion is concentrically placed on a distal end of said elongated portion, wherein said elongated portion comprises a cylindrical shape, wherein said handle protrusion comprises a circular shape, wherein the diameter of said handle protrusion is larger than the diameter of said elongated portion; and b. a shovel assembly, including a shovel end having an elliptical configuration body, wherein said shovel end includes a front side and a back side configured to be revealed, wherein said frontside includes indicia printed thereon, wherein said indicia is an inspirational message or any message, wherein said back side includes a QR code printed thereon configured to be scanned when said dissolvable composition is dissolved, wherein said shovel assembly further includes a dissolvable composition having a flavor which extends an entire inner body thereof defining an elliptical shape, wherein said flavor of said dissolvable composition is a chocolate flavor having a protein supplement, wherein said dissolvable composition envelops said shovel end and extends thereon said elongated portion, wherein said dissolvable composition is an integral part of said shovel end and said elongated portion, said elongated portion covered by a predetermined half portion by said shovel;

c. a beverage container, including a liquid therein, wherein a user inserts said shovel end containing dissolvable composition into said liquid, wherein a user then stirs said shovel end using said elongated portion to then dissolve said dissolvable composition to flavor said liquid configured to receive said shovel with said dissolvable composition, said shovel end configured to be stirred by a user with said elongated portion, said elongated portion configured to dissolve said dissolvable composition into liquid container within said beverage container; and d. a mobile device, configured to scan said QR code using said mobile device by a user to reveal an additional inspirational message to a user, wherein a user may then share said inspirational message to additional users.

\* \* \* \* \*